United States Patent
Fuerst (10) Patent No.: US 9,136,620 B2
(45) Date of Patent: Sep. 15, 2015

(54) CONNECTING ELEMENT AND RELATED FLUID ASSEMBLY

(75) Inventor: Rainer Fuerst, Immenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 862 days.

(21) Appl. No.: 13/376,972

(22) PCT Filed: Apr. 9, 2010

(86) PCT No.: PCT/EP2010/054704
§ 371 (c)(1),
(2), (4) Date: Dec. 8, 2011

(87) PCT Pub. No.: WO2010/142477
PCT Pub. Date: Dec. 16, 2010

(65) Prior Publication Data
US 2012/0080626 A1  Apr. 5, 2012

(30) Foreign Application Priority Data
Jun. 8, 2009 (DE) .................. 10-2009-026-816

(51) Int. Cl.
*F16K 31/02* (2006.01)
*H01R 12/58* (2011.01)
(Continued)

(52) U.S. Cl.
CPC .............. *H01R 12/58* (2013.01); *B60T 8/3675* (2013.01); *H01R 4/2429* (2013.01)

(58) Field of Classification Search
CPC ..... H01R 12/58; H01R 4/2429; B60T 8/3675
USPC ................ 251/129.15; 303/119.2; 439/405, 439/246–248; 335/278
See application file for complete search history.

(56) References Cited

U.S. PATENT DOCUMENTS 4,351,582 A    9/1982  Emerson et al.
4,738,631 A *  4/1988  Takahashi et al. ............ 439/248
(Continued)

FOREIGN PATENT DOCUMENTS

CN    101204955 A    6/2008
DE    44 12 664      10/1995
(Continued)

OTHER PUBLICATIONS

International Search Report corresponding to PCT Application No. PCT/EP2010/054704, mailed Aug. 17, 2010 (German and English language document) (7 pages).

*Primary Examiner* — John Bastianelli
(74) *Attorney, Agent, or Firm* — Maginot, Moore & Beck LLP (57) ABSTRACT

A connecting element for electrically connecting two components to a first electric contact element for electrically contacting a first component, to a second electric contact element for electrically contacting a second component, and to at least one tolerance compensating element is disclosed. The fluid assembly includes at least one such connecting element. The connecting element is configured as one piece and the first electric contact element and the second electric contact element are connected to each other by way of the at least one tolerance compensating element. The first variable tolerance compensating element enables a compensation in length in at least one spatial direction in order to predetermine a desired spatial position of the first contact element and the second contact element in relation to each other. The first variable tolerance compensating element may be three-dimensionally shaped by bending.

14 Claims, 5 Drawing Sheets

(51) Int. Cl.
*B60T 8/36* (2006.01)
*H01R 4/24* (2006.01)

(56) References Cited

U.S. PATENT DOCUMENTS

| | | | |
|---|---|---|---|
| 5,112,235 A * | 5/1992 | Enomoto et al. | 439/83 |
| 5,122,066 A * | 6/1992 | Plossmer | 439/78 |
| 5,275,478 A * | 1/1994 | Schmitt et al. | 303/119.2 |
| 5,306,169 A * | 4/1994 | Fukushima et al. | 439/248 |
| 5,692,813 A * | 12/1997 | Vellmer | 303/119.2 |
| 5,762,318 A * | 6/1998 | Staib et al. | 251/129.15 |
| 5,845,672 A * | 12/1998 | Reuter et al. | 335/260 |
| 5,949,320 A * | 9/1999 | Cossins et al. | 303/119.2 |
| 6,985,060 B2 * | 1/2006 | Parker et al. | 303/119.2 |
| 2004/0067698 A1 * | 4/2004 | Lee | 439/885 |

FOREIGN PATENT DOCUMENTS

| | | |
|---|---|---|
| DE | 10 2004 050 715 B3 | 3/2006 |
| EP | 0 312 846 | 4/1989 |
| EP | 0 411 888 | 2/1991 |
| EP | 0 848 455 | 6/1998 |
| GB | 2 188 497 | 9/1987 |
| JP | 55-53882 A | 4/1980 |
| JP | 62-160479 A | 7/1987 |
| JP | 6-176801 | 6/1994 |
| JP | 6-179801 A | 6/1994 |
| JP | 10-500245 A | 1/1998 |
| JP | 2002-539017 A | 11/2002 |
| WO | 2009/071381 | 6/2009 |

* cited by examiner

CONNECTING ELEMENT AND RELATED FLUID ASSEMBLY

This application is a 35 U.S.C. §371 National Stage Application of PCT/EP2010/054704, filed on Apr. 9, 2010, which claims the benefit of priority to Application Serial No. DE 10 2009 026 816.2, filed on Jun. 8, 2009 in Germany, the disclosures of which are incorporated herein by reference in their entirety.

BACKGROUND

The disclosure relates to a connecting element for electrically connecting a first component to a second component of the generic type according to a related fluid assembly.

Laid-open application DE 44 12 664 A1 therefore discloses, for example, an electrohydraulic pressure adjustment apparatus for a slip-controlled vehicle brake system. The described pressure adjustment apparatus has at least one valve which is joined to the valve block and has a valve dome which projects from the valve block and onto which a coil, which is arranged in a cover, can be fitted. Electrical contact elements which are cohesively connected to one another emerge from the coil and from the cover. The electrical contact elements of the coil and of the cover are of flexible design. They implement both the electrical connection and the holding function for the coil. They also allow the coil to be aligned when it is fitted onto the valve dome. The electrical contact elements of the cover are designed in the form of stamped-grid strips which are cast into the cover which is composed of an insulating material. The stamped-grid strips extend at a right angle to the longitudinal axis of the coil running plane and have meandering angled sections, as a result of which the stamped-grid strips have a relatively high degree of elastic flexibility in a plane which runs at a right angle to the longitudinal axis of the coil. The stamped-grid strips have, at their free end, a fastening lug which runs parallel to the associated connecting wire of the coil and is connected to said connecting wire by a cohesive connection such as welding or soldering.

SUMMARY

The connecting element according to the disclosure for electrically connecting two components having the features of independent patent claim 1 has, in contrast, the advantage that the connecting element is of one-piece design, and the first electrical contact element and the second electrical contact element are connected to one another by means of at least one tolerance compensation element, with a first variable tolerance compensation element permitting length compensation in at least one direction in space in order to prespecify a desired spatial positioning of the first contact element and of the second contact element in relation to one another, and with the first variable tolerance compensation element being three-dimensionally shaped by bending. The three-dimensional design of the first variable tolerance compensation element results in operation in the manner of a torsion spring and therefore considerably improved mechanical decoupling and a reduction in forces in the contact region of the first contact element.

A fluid assembly having a connecting element according to the disclosure for electrically connecting a magnet assembly of a solenoid valve to a printed circuit board of a controller having the features set forth below has the advantage that a magnet coil of the magnet assembly is electrically connected to the printed circuit board by means of at least one connecting element according to the disclosure, with the first contact element of the connecting element respectively being connected to a connecting dome of the magnet assembly, and the second electrical contact element of the connecting element being connected to a contact region of the printed circuit board. After being electrically connected to the printed circuit board, the magnet assembly is fitted on a valve cartridge, which projects beyond a fluid block of the fluid assembly, with a first variable tolerance compensation element, which connects the first contact element to the second contact element, permitting length compensation in at least one direction in space in order to prespecify a desired spatial positioning of the first contact element and of the second contact element in relation to one another and to compensate for existing positional tolerances since the magnet coil surrounds the valve cartridge, which is mounted in the fluid block, with radial play. Furthermore, the tolerance compensation element can compensate for changes in length which are caused by changes in temperature. The connecting element according to the disclosure can be used to advantageously electrically connect the magnet coil directly to the printed circuit board without a stamped grid and without a welding or soldering process.

Embodiments of the present disclosure permit very good mechanical decoupling of the thermal and dynamic reciprocating movements of the intermediate base of the controller in relation to the contact point on the coil wire of the magnet coil. In addition, this provides a sufficient degree of freedom from forces and freedom of movement of the coil wire contact-making means for a cold contact-making connection. The three-dimensional shaping of the tolerance compensation element of the connecting element according to the disclosure can create additional installation space above the magnet coil, so that a considerably extended meander for the tolerance compensation element can be accommodated, it being possible, in addition, for said meander to be loaded not only as a bending bar but also as a torsion spring in the event of various relative movements. Both extending the meander of the tolerance compensation element and changing the loading result in considerably reduced mechanical stresses in the connecting element according to the disclosure itself and considerably reduced amounts of force being introduced at the contact point of the first contact element in relation to the coil wire of the magnet coil.

Advantageous improvements to the connecting element specified in independent patent claim 1 and to the fluid assembly specified in independent patent claim 9 are possible by virtue of the measures and developments cited in the dependent claims.

It is particularly advantageous for the bent portion of the first variable tolerance compensation element to be shaped to form an omega. Shaping the bent portion of the meander of the first tolerance compensation element to form an omega provides the best-possible compromise between the installation space, the elasticity for mechanical decoupling, the stability for absorbing vibrations and mechanical forces before installation and the ease of manufacture of the connecting element, for example by stamping and bending.

In one refinement of the connecting element according to the disclosure, the two contact elements implement different types of cold contact-making connections, with the types of cold contact-making connections comprising an insulation displacement connection and/or a plug connection. On account of the use of an insulation displacement connection, it is no longer necessary to strip the insulation coating of the coil wire at the wire ends of the winding. In addition, no thermal processes, which are susceptible to faults, are required in the case of an insulation displacement connection or plug connection, as a result of which process monitoring and the process devices can be realized at lower cost.

The connecting element according to the disclosure is designed, for example, in the form of a one-piece stamped part which can be produced in a simple and cost-effective manner. In this case, the bent portion, which is designed in the form of an omega for example, of the meander of the first tolerance compensation element, is, after stamping, bent over substantially perpendicular to the starting position in a further production step.

In one refinement of the connecting element according to the disclosure, the first contact element comprises, for example, a cutting element for establishing the electrical insulation displacement connection to the coil wire. In addition, the first contact element comprises an integrally formed mechanical connection element in order to mechanically connect the first contact element to a corresponding contact receptacle of the magnet assembly. In addition, an additional hole, can be made in the first contact element, above the cutting element, for alignment purposes during mounting. The second contact element is designed, for example, in the form of a plug connection at one end, it being possible to insert said plug connection into a corresponding plug receptacle in the printed circuit board in order to establish an electrical and mechanical connection. The second contact element, which is designed in the form of a plug connection, can have a mechanical connection element at the other end, it being possible to press the second contact element into an aperture by way of said mechanical connection element.

In one refinement of the fluid assembly according to the disclosure, the first tolerance compensation element, which is arranged between the first electrical contact element and the second electrical contact element, performs length compensation in at least one direction in space in order to prespecify a desired spatial positioning of the first contact element and of the second contact element in relation to one another, with a lateral spacing between the two contact elements being selected such that the second contact element projects laterally beyond the magnet assembly by way of the mechanical connection element. A second tolerance compensation element, which is arranged between the second contact element and the mechanical connection element, performs length compensation between the printed circuit board and the intermediate base of the controller.

Advantageous embodiments of the disclosure are illustrated in the drawings and will be described in the text which follows. In the drawings, identical reference symbols designate components and elements which perform the same or similar functions.

DETAILED DESCRIPTION

A conventional fluid assembly, which is used, for example, in an anti-lock brake system (ABS) or a traction control system (ASR system) or an electronic stability program system (ESP system), generally comprises a controller and a fluid region, which comprise at least one fluid component, which is designed in the form of a fluid block or in the form of a pump motor for example, and at least one fluid control element which is designed, for example, in the form of a valve cartridge which is part of a related solenoid valve. In order to actuate the at least one fluid component and the at least one fluid control element, the controller comprises a printed circuit board which, at the same time, are used as a circuit mount and to connect a consumer plug, which is located on the housing, and the solenoid valves. In addition, the controller comprises magnet assemblies which are likewise part of the respectively related solenoid valve and are required to adjust the fluid control elements which are designed in the form of valve cartridges. The magnet assemblies generate a magnetic force by means of electrical magnet coils in each case, it being possible to use said magnetic force to adjust the fluid control elements which set corresponding volumetric flows which are routed in fluid ducts of the fluid component which is designed in the form of a fluid block. The magnet coils usually comprise an iron core, a winding carrier and a wire winding and can be electrically connected to electronic circuits on the printed circuit board. The electrical magnet coils of the magnet assemblies are contacted via a stamped grid which is electrically connected to at least one electronic circuit of the printed circuit board, with the magnet assemblies, which are electrically connected to the printed circuit board via the stamped grid, being fitted on the fluid control elements which are designed in the form of valve cartridges and are firmly connected, preferably caulked, for example, to the fluid component which is designed in the form of a fluid block. The stamped grid used is highly complicated in terms of design and tools required, is highly inflexible and can be varied only with difficulty over the life of the process. In addition, a further electrical connection piece, for example in the form of individual connecting pins, is required between the stamped grid and the printed circuit board, in conjunction with the printed circuit board technology.

Figure 1:
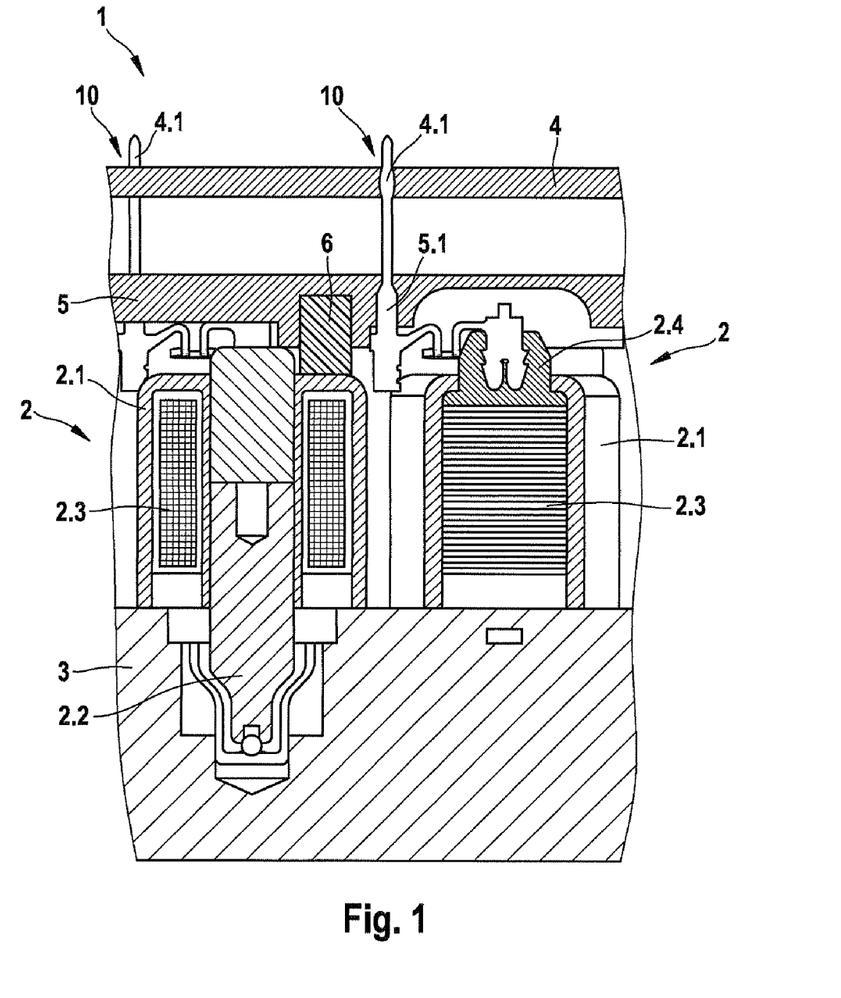
FIG. 1 shows a schematic sectional illustration of an exemplary embodiment of a fluid assembly according to the disclosure.

As can be seen in FIG. 1, a fluid assembly 1 according to the disclosure comprises a fluid block 3, a printed circuit board 4 which is arranged in a controller, and a plurality of solenoid valves 2, of which two solenoid valves 2 are illustrated. The solenoid valves 2 each comprise a magnet assembly 2.1, which has a magnet coil 2.3 and two connecting domes 2.4, and a valve cartridge 2.2 which is mounted in the fluid block 3. The magnet assemblies 2.1 of the solenoid valves 2 are each fitted on the valve cartridges 2.2, which project beyond the fluid block 3. The magnet coils 2.3 of the magnet assemblies 2.1 are each electrically connected to the printed circuit board 4 by means of two connecting elements 10 according to the disclosure. As can also be seen in FIG. 1, the magnet assemblies 2 are each pressed on the fluid block 3 by an elastic holding element 6, which is supported on the intermediate base 5 of the controller housing, in order to prevent or to reduce vibrational loading on the connecting elements 10.

Figure 2:
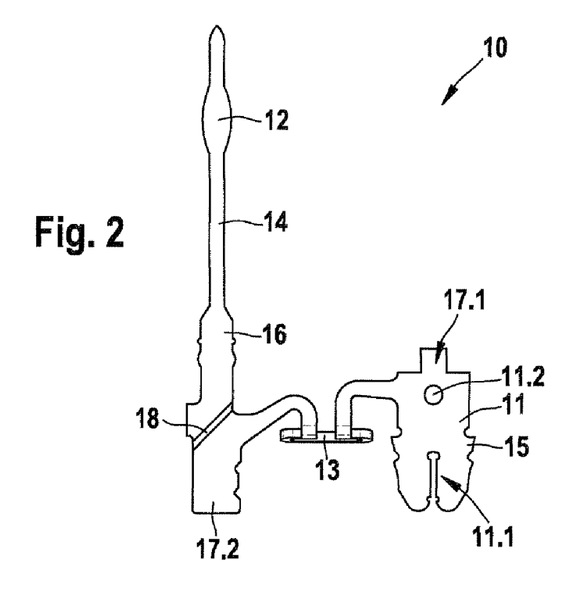
FIG. 2 shows a schematic illustration of an exemplary embodiment of a connecting element according to the disclosure.
Figure 3:
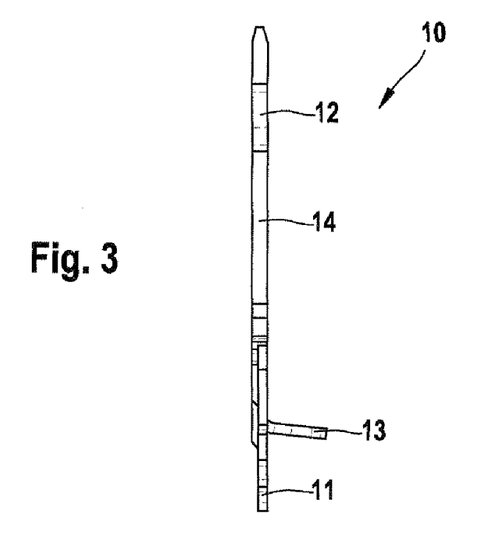
FIG. 3 shows a side view of the exemplary embodiment of a connecting element according to the disclosure from FIG. 2.
Figure 4:
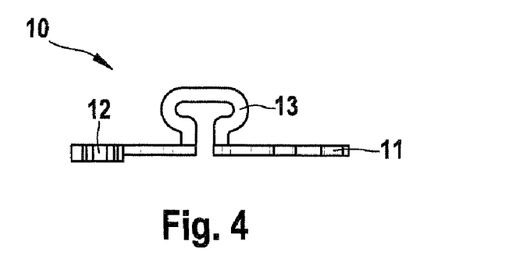
FIG. 4 shows a plan view of the exemplary embodiment of a connecting element according to the disclosure from FIG. 2.

As can be seen in FIGS. 2 to 4, a connecting element 10 according to the disclosure for electrically connecting the magnet coil 2.3 to the printed circuit board 4 comprises a first electrical contact element 11 for making electrical contact with the magnet coil 2.3 and a second electrical contact element 12 for making electrical contact with the printed circuit board 4, with the two contact elements 11, 12 being connected to one another by means of a first tolerance compensation element 13 and a second tolerance compensation element 14.

As can also be seen in FIGS. 2 to 4, the two contact elements 11, 12 implement different types of cold contact-making connections, with the first contact element 11 comprising a cutting element 11.1 for establishing an electrical insulation displacement connection to a coil wire of the magnet coil 2.3 and an integrally formed mechanical connection element 15 in order to mechanically connect the first contact element 11 to the corresponding connecting dome 2.4 of the magnet assembly 2.1. The second contact element 12 is designed in the form of a plug connection at one end, it being possible to insert or press said plug connection into a corresponding plug receptacle 4.1, which is illustrated in FIG. 1, in the printed circuit board 4 in order to establish an electrical and mechanical connection, and thus in order to implement the cold contact-making connection between the plug connection and the plug receptacle 4.1. At the other end, the second contact element 12, which is designed in the form of a plug connection, has a mechanical connection element 16, it being possible to press the second contact element 12 into an aperture 5.1 in an intermediate base 5 of the controller by way of said mechanical connection element. The first variable tolerance compensation element 13 allows length compensation in at least one direction in space in order to prespecify a desired spatial positioning of the first contact element 12 and of the second contact element 13 in relation to one another, with the first variable tolerance compensation element 13 being three-dimensionally shaped by bending. The bent portion of the first variable tolerance compensation element 13 is shaped to form an omega in the illustrated exemplary embodiment. The second tolerance compensation element 14 is arranged between the second contact element 12 and the mechanical connection element 16 and permits length compensation between the printed circuit board 4 and the intermediate base 5 of the controller. In the illustrated exemplary embodiment, the connecting element 10 according to the disclosure is designed in the form of a one-piece stamped part which can be produced in a simple and cost-effective manner. In this case, the bent portion, which is designed in the form of an omega, of the meander of the first tolerance compensation element 13, is, after stamping, bent over substantially perpendicular to the starting position in a further production step, as can be seen in FIGS. 2 to 4.

As can also be seen in FIGS. 2 to 4, the second contact element 12 can have a defined material thickness, which is different from the first contact element 11, depending on the design of the plug receptacle 4.1 or the press-in zone in the printed circuit board 4, and therefore a material thickness difference 18 is produced between the second contact element 12 and the first tolerance compensation element 13. The material thickness difference 18 can be realized, for example, by a milled step.

Therefore, the connecting elements 10 according to the disclosure electrically connect the magnet coils 2.3 of the magnet assemblies 2.1 to the electronics on the printed circuit board 4. The connecting element 10 is mechanically connected to an aperture 5.1 in the intermediate base 5 of the controller, for example, by means of a mechanical connection element 16, which is designed in the form of a latching contour, by being pressed on. This ensures that, starting from the magnet coil 2.3, no mechanical forces can be transmitted to the electrical cold contact-making connection of the second contact element 12 in the printed circuit board 4. The insulation displacement connection of the first contact element 11 to the connecting dome 2.4 is shaped such that the electrical cold contact-making connection to the coil wire of the magnet coil 2.3 is made in the cutting element 11.1, which is designed in the form of a slot, and the mechanical connection to the connecting dome 2.4 of the magnet assembly 2.1 is established at the mechanical connection element 15 which is designed in the form of an external tooth system.

Figure 5:
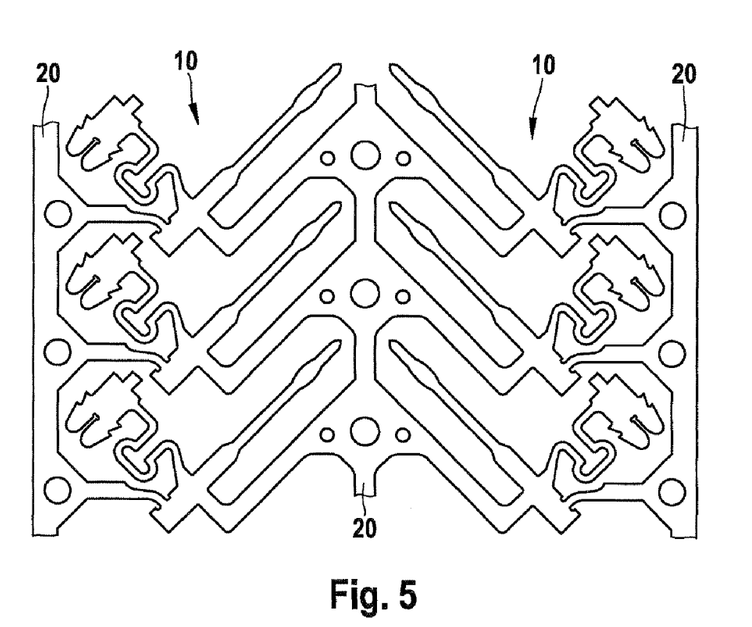
FIG. 5 shows a schematic illustration of a belt having a plurality of connecting elements according to the disclosure.
Figure 6:
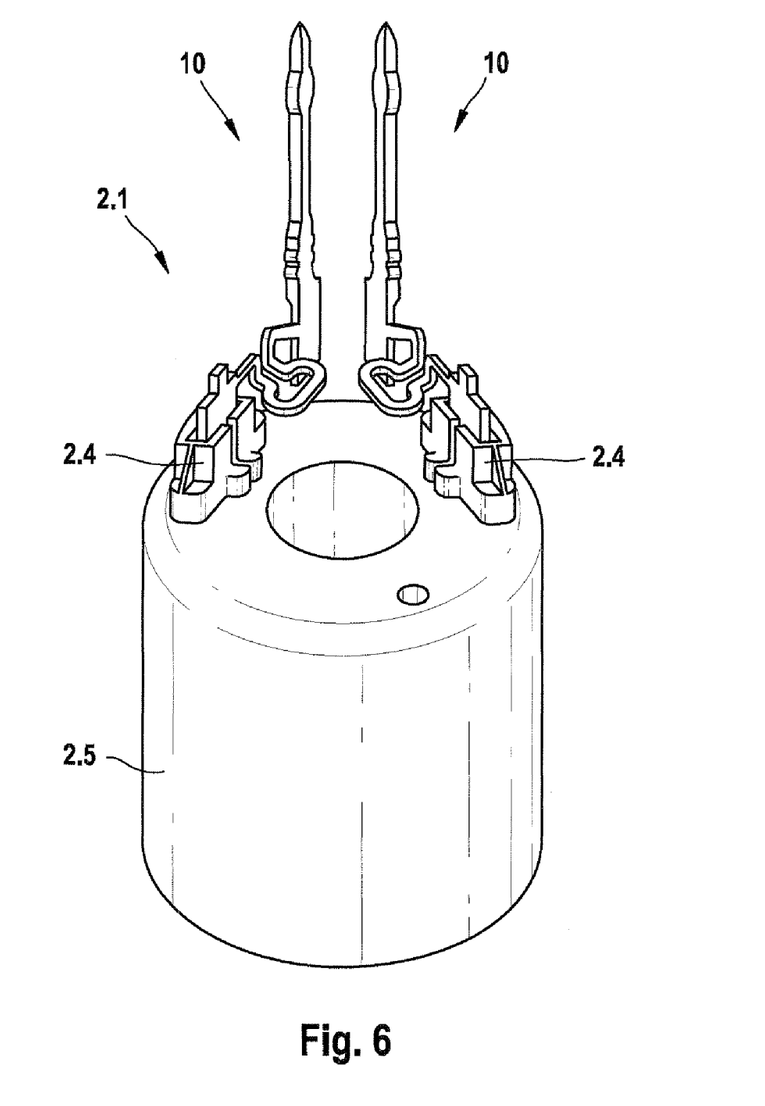
FIG. 6 shows a schematic perspective illustration of an exemplary embodiment of a magnet assembly for the fluid assembly according to the disclosure as per FIG. 1.
Figure 7:
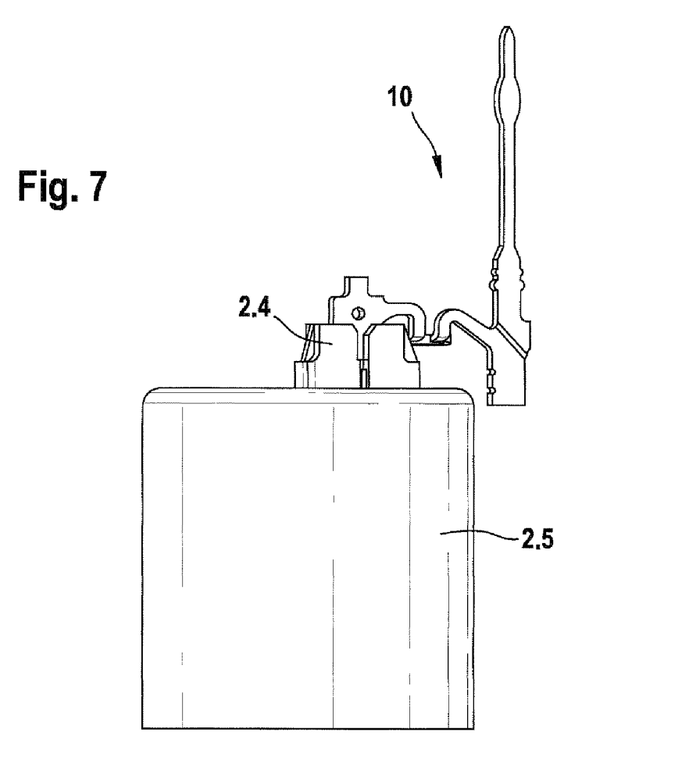
FIG. 7 shows a side view of the exemplary embodiment of the magnet assembly from FIG. 6 for the fluid assembly according to the disclosure as per FIG. 1.
Figure 8:
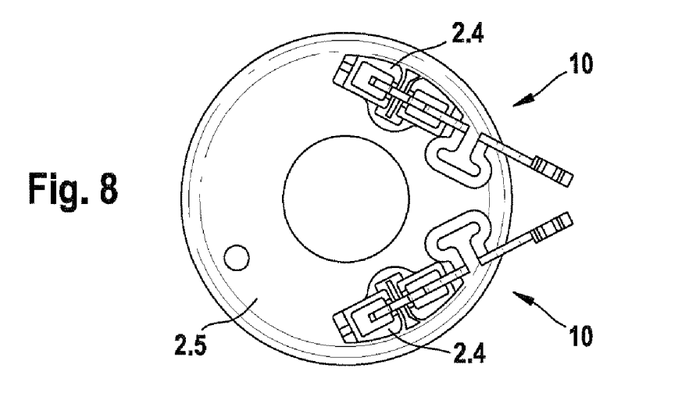
FIG. 8 shows a plan view of the exemplary embodiment of the magnet assembly from FIG. 6 for the fluid assembly according to the disclosure as per FIG. 1.

As can be seen in FIGS. 6 to 8, a magnet assembly 2.1, which is illustrated by way of example, comprises two connecting domes 2.4 and a housing casing 2.5 which covers the magnet coils 2.3 which are wound onto a winding former. In order to mount the two connecting elements 10 for making contact with the magnet assembly 2.1, the connecting elements 10 are, as can be seen in FIG. 5, supplied on a belt 20. The connecting elements 10 are then separated and the portion, which is designed in the form of an omega, of the meander of the first tolerance compensation element 13 is bent over substantially perpendicular to the starting position. For mounting purposes, the connecting element 10 according to the disclosure is picked up by a grabber at a first grabber position 17.1 above the first contact element 11 and pushed into the corresponding connecting dome 2.4 of the magnet assembly 2.1, with the electrical contact between the first contact element 11 and the coil wire being established by the insulation displacement connection. An additional hole 11.2 is made in the first contact element 11, above the cutting element 11.1, for alignment purposes during mounting. The fact that the connecting elements 10 are routed laterally beyond the diameter of the magnet assembly 2.1 allows the connecting element 10 to be picked up directly at a second grabber position 17.2 below the second contact element 12 and allows the connecting element 10, together with the magnet assembly 2.1, to be pressed into the intermediate base 5 of the controller housing with force. In addition, the forces which act on the second contact element 12 as the printed circuit board 4 is being pressed can be absorbed via this grabber position 17.2. The magnet coil 2.3 surrounds the valve cartridge 2.2, which is mounted in the fluid block 3, with very little radial play, and therefore the position of the magnet coil 2.3, which is premounted in the controller, is influenced directly by the positional tolerances of the valve cartridge. Since the latching positions of the connecting elements 10 in the intermediate base 5 of the controller housing are independent of these tolerances, the connecting elements 10 have the option of one-off tolerance compensation during mounting by virtue of the first tolerance compensation elements 13. Therefore, the second contact elements 12 can be picked up by means of the second grabber position 17.2 and be aligned for mounting in the corresponding aperture 5.1 in the intermediate base 5 of the controller housing by deformation of the first tolerance compensation elements 13. The first tolerance compensation elements 13 each extend substantially at a right angle to the longitudinal axis of the first contact element 11 and to the longitudinal axis of the second contact element 12, and therefore the longitudinal axes of the two contact elements 11 and 12 run substantially parallel to one another. In the illustrated exemplary embodiment, the first tolerance compensation element 13 has two meandering angled sections between which the bent-over portion which is designed in the form of an omega is arranged, as a result of which the respective connecting element 10 has a relatively high degree of elastic flexibility between the two contact elements 11, 12.

The connecting element according to the disclosure advantageously performs the requisite tolerance compensation between the magnet assembly and the wiring plane, allows a cost saving to be made by reducing the number of parts or quantities of material, processes, systems etc., and increases the flexibility and ability to modularize the assembly for various applications, for example in an anti-lock brake system (ABS) or a traction control system (ASR system) or an electronic stability program system (ESP system). In addition, the space requirements in the entire system can be reduced.

Furthermore, the connecting element according to the disclosure allows considerably improved mechanical decoupling and a reduction in forces in the contact region on the coil side. The three-dimensional shaping of the meander of the first tolerance compensation element by bending additionally results in operation in the manner of a torsion spring. This provides optimum mechanical decoupling of the thermal and dynamic reciprocating movements of the controller intermediate base in relation to the contact point on the coil wire. In addition, a considerably extended meander of the first tolerance compensation element can be accommodated on account of the additionally obtained installation space above the magnet coil, said meander, in addition, being loaded not only as a bending bar but also as a torsion spring in the event of various relative movements. Both extending the meander of the tolerance compensation element and changing the loading result in considerably reduced mechanical stresses in the connecting element according to the disclosure itself and considerably reduced amounts of force being introduced at the contact point of the insulation displacement contact (IDC) in relation to the coil wire.

The invention claimed is:

1. A connecting element for electrically connecting a first component and a second component, comprising:
a first electrical contact element configured to make electrical contact with the first component,
a second electrical contact element configured to make electrical contact with the second component,
a first mechanical connection element configured to mechanically connect the first electrical contact element to the first component,
a second mechanical connection element configured to mechanically connect the second electrical contact element to the second component, and
at least one tolerance compensation element,
wherein the connecting element is of one-piece design,
wherein the first electrical contact element and the second electrical contact element are connected to one another by the at least one tolerance compensation element,
wherein the at least one tolerance compensation element includes a first variable tolerance compensation element configured to permit length compensation in at least one direction in space in order to prespecify a desired spatial positioning of the first electrical contact element and of the second electrical contact element in relation to one another,
wherein the first variable tolerance compensation element is configured to be three-dimensionally shaped by bending,
wherein the first electrical contact element comprises a cutting element configured to establish an electrical insulation displacement connection to a coil wire,
wherein the first mechanical connection element is a shaped mechanical connection element configured to mechanically connect the first electrical contact element to a corresponding contact receptacle of the first component, and
wherein an alignment hole is defined in the first electrical contact element above the cutting element.

2. The connecting element as claimed in claim 1, wherein:
the first variable tolerance compensation element includes a bent portion, and
the bent portion is shaped to form an omega.

3. The connecting element as claimed in claim 1, wherein:
the first electrical contact element and the second electrical contact element each include a cold contact-making connection comprising an insulation displacement connection or a plug connection; and
the cold contact-making connection of the first electrical contact element is different than the cold contact-making connection of the second electrical contact element.

4. The connecting element as claimed in claim 1, wherein the connecting element is configured in the form of a one-piece stamped part.

5. The connecting element as claimed in claim 1, wherein:
the second electrical contact element is configured in the form of a plug connection at one end;
the second mechanical connection element is defined at least in part by the plug connection; and
the plug connection is configured to be insertable into a corresponding plug receptacle defined in the second component in order to establish an electrical and mechanical connection.

6. The connecting element as claimed in claim 1, wherein:
the second electrical contact element is configured in the form of a plug connection at a first end of the second electrical contact element;
the second mechanical connection element is defined at a second end of the second electrical contact element; and
the second electrical contact element is configured to be pressed into an aperture by way of the second mechanical connection element.

7. A fluid assembly, comprising:
a controller,
a fluid block,
a printed circuit board arranged in the controller, and
at least one solenoid valve which comprises a magnet assembly having a magnet coil and two connecting domes, and a valve cartridge which is mounted in the fluid block, with the magnet assembly being fitted on the valve cartridge which projects beyond the fluid block,
wherein the magnet coil is electrically connected to the printed circuit board by at least one connecting element;
wherein the at least one connecting element includes (i) a first electrical contact element configured to make electrical contact with the at least one solenoid valve, (ii) a second electrical contact element configured to make electrical contact with the printed circuit board, and (iii) at least one tolerance compensation element;
wherein the connecting element is of one-piece design;
wherein the first electrical contact element and the second electrical contact element are connected to one another by the at least one tolerance compensation element;
wherein the at least one tolerance compensation element includes a first variable tolerance compensation element configured to permit length compensation in at least one direction in space in order to prespecify a desired spatial positioning of the first contact element and of the second contact element in relation to one another;

wherein the first variable tolerance compensation element is configured to be three-dimensionally shaped by bending;

wherein the first contact element respectively is connected to one of the connecting domes, and the second electrical contact element is connected to a contact region of the printed circuit board;

wherein the at least one connecting element further includes a mechanical connection element;

wherein the at least one tolerance compensation element further includes a second tolerance compensation element;

wherein the controller further includes an intermediate base;

wherein the first electrical contact element and the second electrical contact element are laterally spaced such that the second contact element projects laterally beyond the magnet assembly by way of the mechanical connection element; and wherein the second tolerance compensation element is arranged between the second contact element and the mechanical connection element and configured to permit length compensation between the printed circuit board and the intermediate base of the controller.

8. The fluid assembly as claimed in claim 7, wherein:

the first electrical contact element comprises a cutting element configured to establish an electrical insulation displacement connection to a coil wire; and the first mechanical connection element is a shaped mechanical connection element configured to mechanically connect the first electrical contact element to a corresponding contact receptacle of the first component.

9. The fluid assembly as claimed in claim 8, wherein:

an alignment hole is defined in the first electrical contact element above the cutting element.

10. The fluid assembly as claimed in claim 8, wherein:

the second electrical contact element is configured in the form of a plug connection at a first end of the second electrical contact element;

the mechanical connection element is defined at a second end of the second electrical contact element; and the second electrical contact element is configured to be pressed into an aperture by way of the second mechanical connection element.

11. The fluid assembly as claimed in claim 7, wherein:

the first variable tolerance compensation element includes a bent portion, and the bent portion is shaped to form an omega.

12. The fluid assembly as claimed in claim 7, wherein:

the first electrical contact element and the second electrical contact element each include a cold contact-making connection comprising an insulation displacement connection or a plug connection; and the cold contact-making connection of the first electrical contact element is different than the cold contact-making connection of the second electrical contact element.

13. The fluid assembly as claimed in claim 7, wherein the connecting element is configured in the form of a one-piece stamped part.

14. The fluid assembly as claimed in claim 7, wherein:

the second electrical contact element is configured in the form of a plug connection at one end;

the mechanical connection element is defined at least in part by the plug connection; and the plug connection is configured to be insertable into a corresponding plug receptacle defined in the second component in order to establish an electrical and mechanical connection.

* * * * *